United States Patent
Lee et al.

(10) Patent No.: US 8,130,672 B2
(45) Date of Patent: Mar. 6, 2012

(54) METHOD OF MULTICASTING AND TRANSMITTING DATA IN PLC NETWORK AND AN APPARATUS THEREOF

(75) Inventors: Ju-han Lee, Suwon-si (KR); Seung-gi Chang, Seoul (KR); Joon-hee Lee, Gunpo-si (KR); Jun-hae Choi, Seongnam-si (KR); In-hwan Kim, Suwon-si (KR); Ji-hoon Kim, Hwaseong-si (KR); Ho-jeong You, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 808 days.

(21) Appl. No.: 11/601,692

(22) Filed: Nov. 20, 2006

(65) Prior Publication Data

US 2007/0195718 A1    Aug. 23, 2007

Related U.S. Application Data

(60) Provisional application No. 60/775,803, filed on Feb. 23, 2006.

(30) Foreign Application Priority Data

Mar. 23, 2006  (KR) .................. 10-2006-0026475
Mar. 31, 2006  (KR) .................. 10-2006-0029809

(51) Int. Cl.
*H04L 12/28* (2006.01)
(52) U.S. Cl. .................. 370/254; 370/432; 709/220
(58) Field of Classification Search .................. None
See application file for complete search history.

(56) References Cited

U.S. PATENT DOCUMENTS

| | | | |
|---|---|---|---|
| 5,832,229 A * | 11/1998 | Tomoda et al. | 709/227 |
| 6,529,882 B1 * | 3/2003 | Park et al. | 705/51 |
| 6,965,767 B2 * | 11/2005 | Maggenti et al. | 455/416 |
| 7,295,525 B2 * | 11/2007 | Shapiro et al. | 370/256 |
| 2004/0064508 A1 * | 4/2004 | Ayyagari et al. | 709/205 |
| 2004/0136393 A1 * | 7/2004 | Riveiro Insua et al. | 370/432 |
| 2004/0208139 A1 * | 10/2004 | Iwamura | 370/321 |
| 2005/0027801 A1 * | 2/2005 | Kashyap et al. | 709/204 |
| 2005/0220131 A1 * | 10/2005 | Ginzburg et al. | 370/432 |
| 2005/0286509 A1 * | 12/2005 | Iwamura | 370/381 |
| 2009/0005109 A1 * | 1/2009 | Nishio et al. | 455/550.1 |

FOREIGN PATENT DOCUMENTS

| | | |
|---|---|---|
| JP | 2003-258898 | 9/2003 |
| KR | 2003-72482 | 9/2003 |
| KR | 2005-103394 | 10/2005 |
| KR | 2006-7843 | 1/2006 |

OTHER PUBLICATIONS

Korean Office Action dated Jan. 17, 2007 issued in KR 2006-29809.

* cited by examiner

*Primary Examiner* — Brian Roberts
(74) *Attorney, Agent, or Firm* — Stanzione & Kim, LLP

(57) ABSTRACT

A method of transmitting data more effectively, and more particularly, a method of transmitting data to a group comprising a plurality of reception stations that receive the same data from a transmission station when the stations communicate the data in a power line communication (PLC) network, and an apparatus to do the same. According to the method, a transmission station transmits data to a group including a plurality of reception stations that receive the same data at a time, to prevent a channel bandwidth from being wasted, and to prevent a station that does not desire to receive the data from receiving the data.

13 Claims, 6 Drawing Sheets

METHOD OF MULTICASTING AND TRANSMITTING DATA IN PLC NETWORK AND AN APPARATUS THEREOF

CROSS-REFERENCE TO RELATED APPLICATIONS

This application claims priority under 35 U.S.C. §120 and 119(a) from of U.S. Patent Application No. 60/775,803, filed on Feb. 23, 2006, in the USPTO, Korean Patent Application Nos. 10-2006-0026475 and 10-2006-0029809, filed on Mar. 23, 2006 and Mar. 31, 2006, respectively, in the Korean Intellectual Property Office, the disclosures of which are incorporated herein in their entireties by reference.

BACKGROUND OF THE INVENTION

1. Field of the Invention

The present general inventive concept relates to a method to transmit data more effectively, and more particularly, to a method to transmit data to a group comprising a plurality of reception stations that receive the same data from a transmission station when the stations transmit and receive the data in a power line communication (PLC) network.

2. Description of the Related Art

A power line communication (PLC) network technology is used to build a communication network for a home network. The PLC network technology uses existing power lines in houses. Accordingly, unlike Ethernet networks, PLC networks do not need additional wiring work, and can be used in basements or shaded areas that wireless networks cannot reach.

Conventionally, stations in a PLC network communicate using two communication methods. One such communication method is a unicast method that is a one-to-one communication method between stations using channel estimation and its result, and a tone map. Another communication method is a broadcast method that transmits data from a transmission station to the PLC network using all channels, without dividing the channels into sub-channels. The stations communicate data using the unicast method, and management information or control information using the broadcast method.

Figure 1A:
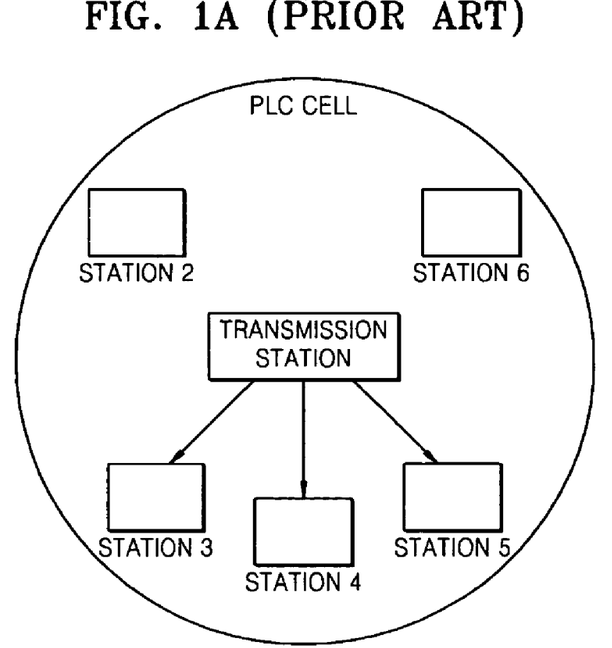
FIG. 1A is a layout diagram illustrating a conventional unicast method that is a one-to-one communication method between a plurality of stations.

FIG. 1A is a layout diagram illustrating a unicast method that is a one-to-one communication method between stations. Referring to FIG. 1A, a transmission station transmits a data frame to reception stations 3 through 5. The transmission station and each of the reception stations communicate data one-to-one. Therefore, a transmission sub-channel selected by estimating a channel between the transmission station and the station 3 is different from a transmission sub-channel selected by estimating a channel between the transmission station and the station 4. Other stations 2 and 6 that do not communicate data with the transmission station can exist in a PLC cell.

Figure 1B:
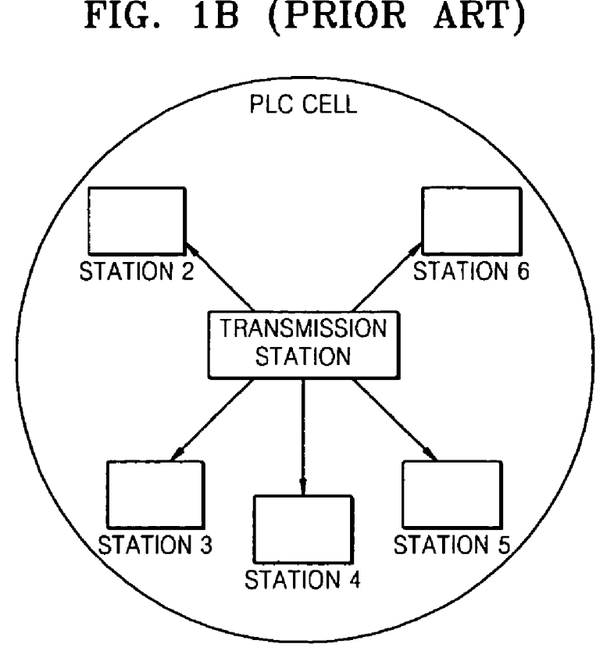
FIG. 1B is a layout diagram illustrating a conventional broadcast method that transmits data to all reception stations included in a power line communication (PLC) cell from a transmission station.

FIG. 1B is a layout diagram of a broadcast method that transmits data to all reception stations 2 through 6 included in a PLC cell from a transmission station. Referring to FIG. 1B, the transmission station transmits data to all the reception stations 2 through 6 included in the PLC cell. Therefore, when the transmission station attempts to transmit data to the reception stations 3 through 5, the reception stations 2 and 6 receive the same data as those received by the reception stations 3 through 5.

According to the unicast method, when the transmission station transmits the same data to the plurality of reception stations, the same data frame must be repeatedly transmitted, causing waste of a channel bandwidth. According to the broadcast method, since a data frame must be transmitted to all the reception stations included in the PLC cell, data is transmitted to a reception station that is not supposed to receive the data.

Therefore, even when the same data is transmitted to the plurality of reception stations in the PLC network, it is necessary to prevent the waste of the channel bandwidth due to the repetitive transmission of the data frame, and it is also necessary to prevent the transmission of the data frame to a reception station that is not supposed to receive data.

SUMMARY OF THE INVENTION

The present general inventive concept provides a data transmission method and apparatus in a power line communication (PLC) network that forms a group, including stations to receive the same data and to transmit data from a transmission station to the group only once, thereby preventing a channel bandwidth from being wasted and a station that is not supposed to receive data from receiving the data.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a data transmission method including forming a group including a plurality of reception stations that receive the same data, and transmitting data from a transmission station to the group.

The method may further include allowing at least one another reception station to join the group after the group is formed.

The at least one another reception station may join the group by a join request thereof.

A coordinator to receive the join request from the at least one another reception station may determine whether the at least one another reception station joins the group.

The coordinator may perform a channel estimation between the at least one another reception station that requests to join the group and the coordinator that receives the join request, and select optimum channels that transmit data to the group according to a result of the channel estimation.

A channel that transmits the data to the group may be selected from the optimum channels within a channel range where all stations included in the group can communicate.

Before requesting to join the group, the at least one another reception station may request information on groups included in a power line communication (PLC) cell.

The at least one another reception station may determine whether to join the group based on the information on the groups. If there is no group to join, the at least one another reception station requests the coordinator to generate a new group, and, if there is the group to join, the at least one another reception station requests the coordinator to allow the at least one another station to join the group.

The at least one another reception station may request to leave the group.

A computer readable recording medium having embodied thereon a computer program to execute a data transmission method may also be included.

The foregoing and/or other aspects and utilities of the present general inventive concept may also be achieved by providing a coordinator device including a group generator to form a group including a plurality of reception stations that receive the same data in response to a request frame from a station that requests to form the group, including the plurality of reception stations that receive the same data, and a response frame generator and transmitter to generate a response frame in response to the request frame and to transmit the response frame to the station.

The coordinator may further include a group join determiner to determine whether to allow the at least one station to join the group, if at least one station requests to join the group.

The coordinator device may further include a channel estimator to perform a channel estimation between the at least one station that requests to join the group and the coordinator device that receives a join request, and to select optimum channels that transmit data to the group according to a result of the channel estimation.

A channel that transmits the data to the group may be selected from the optimum channels within a channel range where all stations included in the group can communicate.

The coordinator device may further include a group information storage unit storing information on all groups included in a PLC cell.

The foregoing and/or other aspects and utilities of the present general inventive concept may also be achieved by providing a station device including a request frame generator to generate a data frame including a field that requests to form a group including a plurality of reception stations that receive the same data, a request frame transmitter to transmit the request frame to a coordinator device, and a response frame receiver to receive a response frame in response to the request frame from the coordinator device.

The request frame generator may generate a data frame including a field that requests to join the group.

The request frame generator may generate a data frame including a field that requests to leave the group.

The request frame generator may generate a data frame including a field that requests information on all groups included in a PCL cell.

The foregoing and/or other aspects and utilities of the present general inventive concept may also be achieved by providing a data transmission system, including a station device to generate a data frame including a field to request to form a group including a plurality of reception stations that receives the same data, and a coordinator device to form the group according to the data frame and to generate a response frame, so that the station communicates with the group for data transmission upon receiving the response frame.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
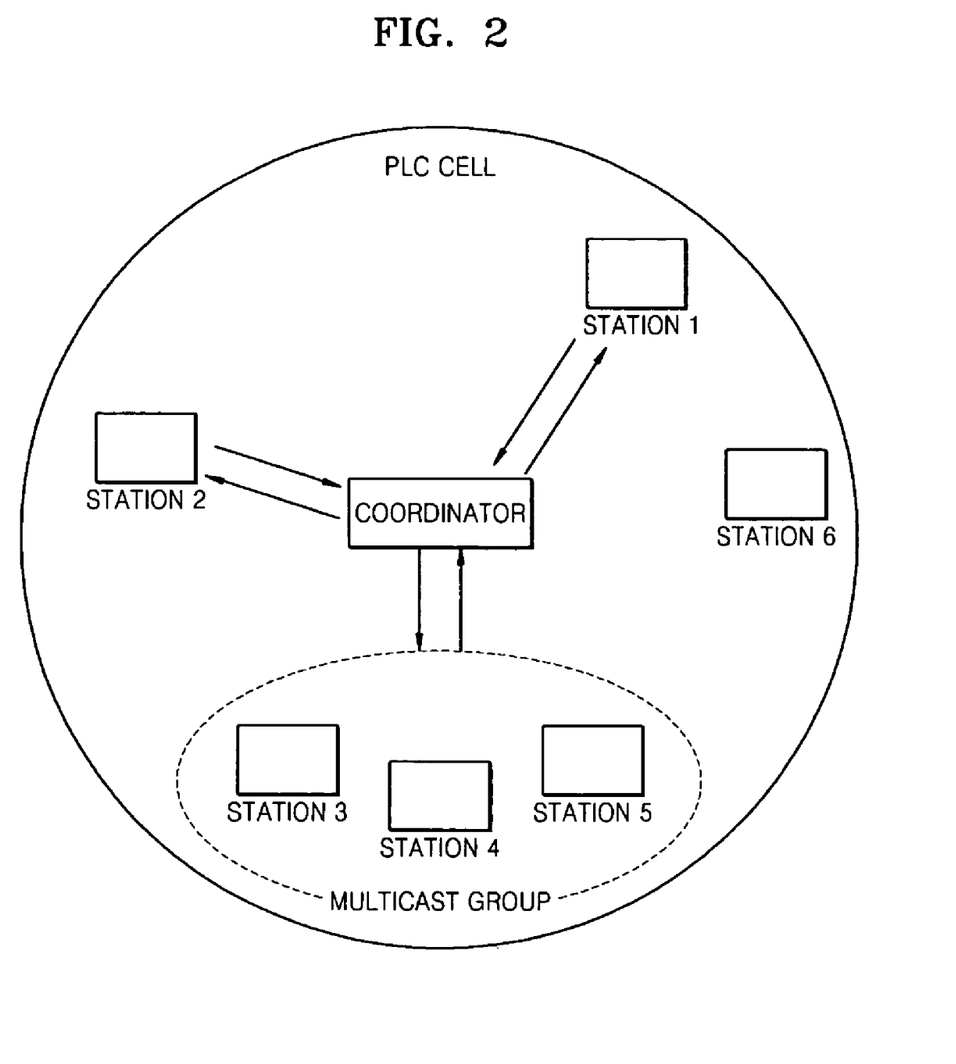
FIG. 2 is a diagram illustrating data communication in a PLC cell using a multicast method through an exchange of command frames between a coordinator and a plurality of stations according to an embodiment of the present general inventive concept.

FIG. 2 is a diagram illustrating data communication in a PLC cell using a multicast method through an exchange of command frames between a coordinator and a plurality of stations. Referring to FIG. 2, stations 3 through 5 forms a single multicast group that receives the same data from a transmission station. If station 1 attempts to transmit data to the multicast group including the stations 3 through 5, the station 1 first transmits the data to the coordinator. The coordinator includes information on all multicast groups included in the PLC cell and information on a data transmission path of each of the multicast groups. The coordinator selects one of data transmission paths between the transmission station and the multicast group that receives the data based on the information, and transmits the data from the station 1 to the multicast group at a particular time. Therefore, the data is transmitted from the station 1 to the multicast group at the particular time, thereby consuming less channel bandwidth than a unicast method that separately transmits data from the station 1 to the stations 3 through 5. Also, unlike a conventional broadcast method that transmits data to all the stations in the PLC cell, the data is not transmitted to a station that does not desire to receive the data, thereby preventing unnecessary data frame processing and waste of a channel bandwidth.

Figure 3:
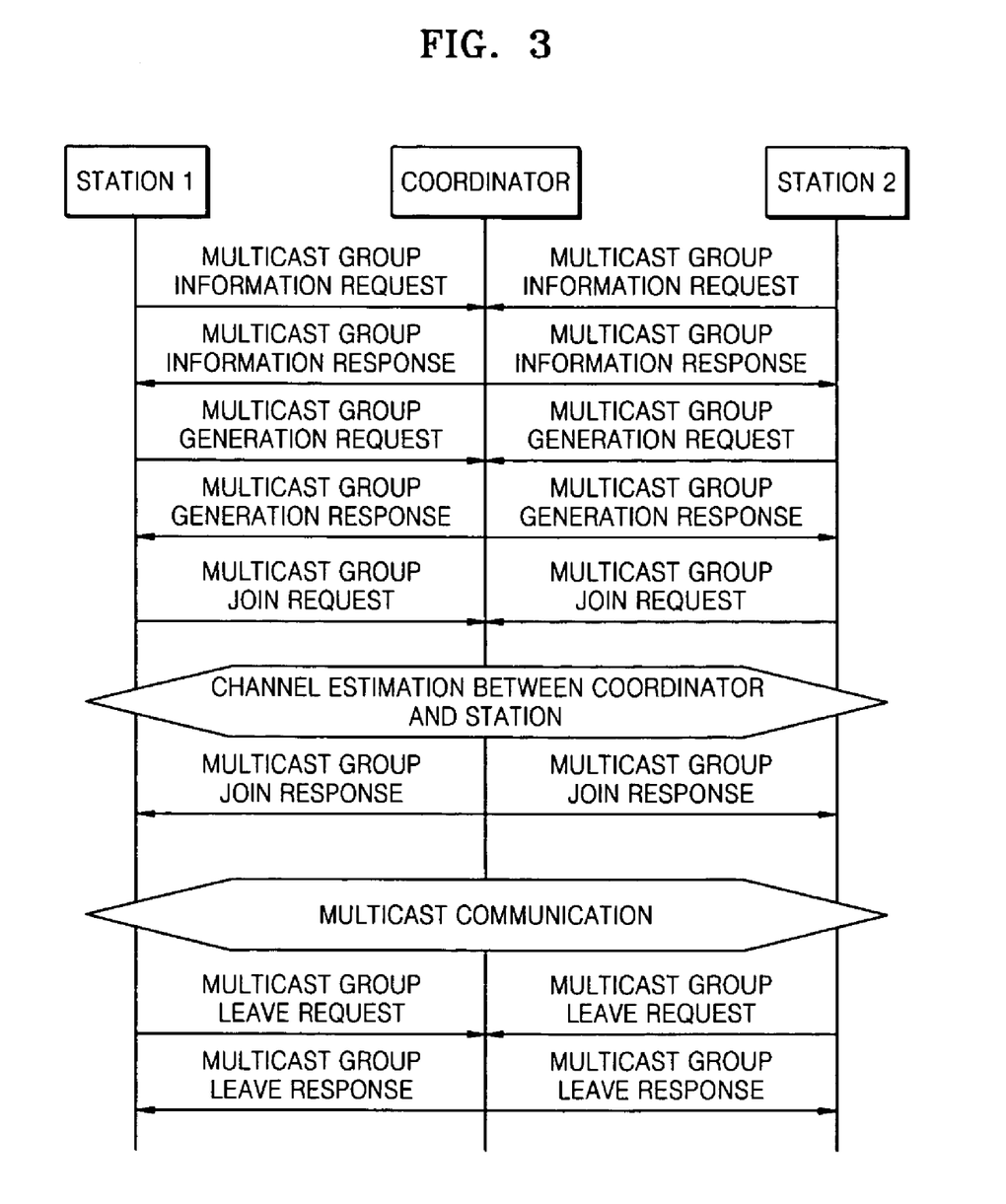
FIG. 3 is a flowchart illustrating a process of exchanging command frames between a coordinator and a plurality of stations required to communicate data using a multicast method in a PLC cell according to an embodiment of the present general inventive concept.

FIG. 3 is a flowchart illustrating a process of exchanging command frames between a coordinator and a plurality of stations required to communicate data using a multicast method in a PLC cell according to an embodiment of the present general inventive concept. FIGS. 4A through 4H are views illustrating field formats of command frames exchanged between the coordinator and the plurality of stations of FIG. 3.

Referring to FIGS. 3-4H, stations 1 and 2 transmit a multicast group information request command frame to the coordinator to request information on multicast groups included in the PLC cell. The coordinator transmits a response command frame to the stations 1 and 2 in response to the request of the stations 1 and 2. The information on the multicast groups includes identifications (IDs) of the multicast groups included in the PLC cell, properties of the multicast groups, a list of stations included in the multicast groups, etc. FIG. 4A is a layout diagram illustrating the multicast group information request command frame transmitted from the stations 1 and 2 to the coordinator. The multicast group information request command frame includes a multicast group information request field indicating a request for multicast group information. FIG. 4B is a layout diagram illustrating the multicast group information response command frame transmitted from the coordinator to the stations 1 and 2. The multicast group information response command frame includes a multicast group information field including the multicast group information.

Figure 4A:
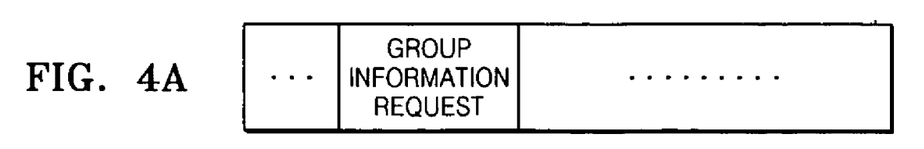
FIGS. 4A through 4H are views illustrating field formats of command frames exchanged between a coordinator and a plurality of stations.
Figure 4B:
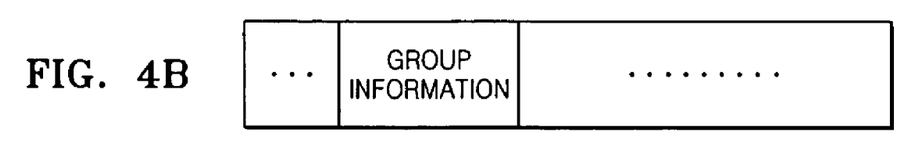
Figure 4C:
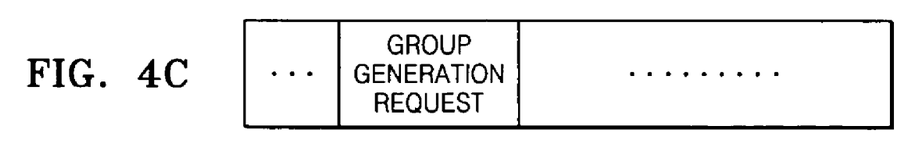
Figure 4D:
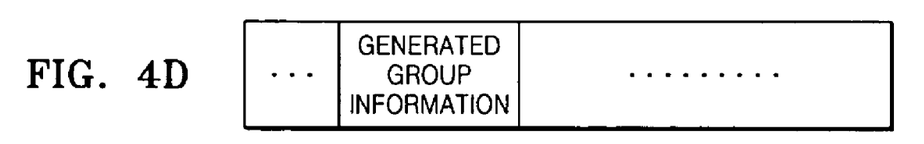
Figure 4E:
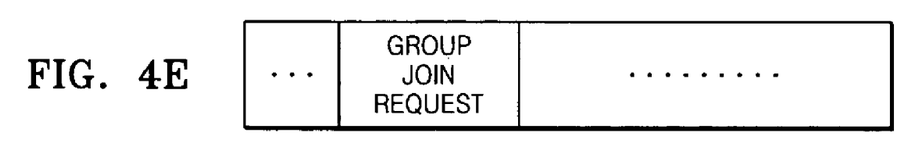
Figure 4F:
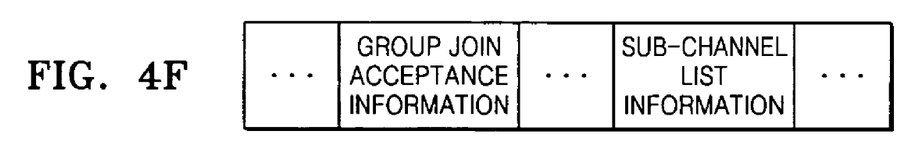

The stations 1 and 2 understand the existence of the multicast groups, the properties and the IDs of the existing multicast groups, and the list of the stations included in the multicast groups according to the multicast group information transmitted from the coordinator, and determine whether to request to join either the existing multicast groups or to request a generation of a new multicast group based on the understood information. If the stations 1 and 2 determine to request the generation of the new multicast group, the stations 1 and 2 transmit a multicast group generation request command frame that requests the generation of the new multicast group to the coordinator. The coordinator transmits a multicast group generation response command frame to the stations 1 and 2 in response to the multicast group generation request of the stations 1 and 2. FIG. 4C is a layout diagram illustrating the multicast group generation request command frame transmitted from the stations 1 and 2 to the coordinator. The multicast group generation request command frame includes a multicast group generation request field indicating the request for the generation of the multicast group. FIG. 4D is a layout diagram illustrating the multicast group generation response command frame transmitted from the coordinator to the stations 1 and 2. The multicast group generation response command frame includes an information field of the multicast group newly generated according to the request for the generation of the multicast group. Here, the new multicast group is formed to include a station with which the station 1 or 2 desires to communicate. The information field includes information on whether the requested new multicast group is generated, properties of the newly generated multicast group, an ID of the newly generated multicast group, etc. If the stations 1 and 2 determine to request to join the existing multicast groups, the stations 1 and 2 transmit a multicast group join request command frame that requests to join the existing multicast groups to the coordinator. FIG. 4E is a layout diagram illustrating the multicast group join request command frame transmitted from the stations 1 and 2 to the coordinator. The multicast group join request command frame includes an information field on the multicast group join request. The information field includes IDs and properties of the multicast groups to be joined, etc. The coordinator transmits a multicast group join response command frame to the stations 1 and 2 in response to the request of the stations 1 and 2 to join the existing multicast groups. FIG. 4F is a layout diagram illustrating the multicast group join response command frame transmitted from the coordinator to the stations 1 and 2. The multicast group join response command frame includes an information field on whether the request to join the existing multicast groups is accepted and an information field on a list of sub-channels used to transmit data from the stations 1 and 2. The information field on the list of sub-channels includes list and status of sub-channels used to transmit data from the stations 1 and 2.

The coordinator determines whether to accept a joining of a plurality of stations before transmitting the multicast group join response command frame to the stations 1 and 2. The coordinator performs a channel estimation between stations that request to join, and the coordinator that receives the request for the join of the stations, and selects one or more optimum sub-channels to transmit data to the multicast group according to a result of the channel estimation. The coordinator selects a sub-channel from the optimum sub-channels to transmit the data to the multicast group within a channel range where all stations included in the multicast group can communicate. The channel estimation may be an estimation on data traffic, a traveling time, unavailability, etc.

Stations included in the multicast group after the multicast group join request or the multicast group generation request is accepted perform multicast communication through the sub-channel selected to transmit the data to the multicast group. At this time, the coordinator informs all the stations included in the PLC cell of a list of sub-channels that perform the multicast communication through a beacon to prevent stations that do not belong to the multicast group from using the sub-channel selected to transmit the data to the multicast group, thereby preventing collisions in channel use between the stations that belong to the multicast group and the stations that do not belong to the multicast group.

Figure 4G:
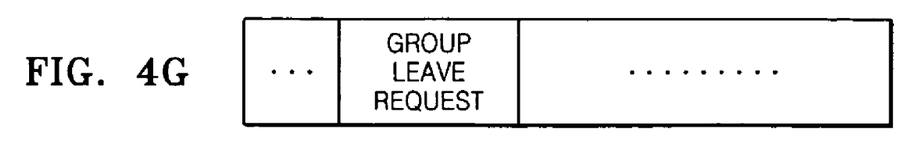
Figure 4H:
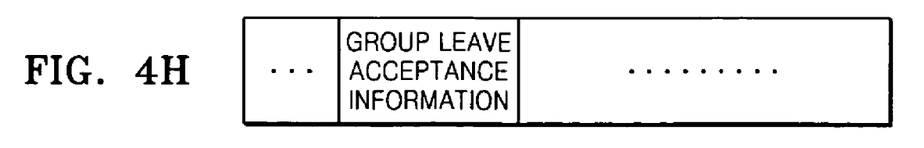

The stations 1 and 2 can request the coordinator to allow the stations 1 and 2 to leave from the multicast group. If the stations 1 and 2 determine to request the coordinator to allow the stations 1 and 2 to leave from the multicast group, the stations 1 and 2 transmit a multicast group leave request command frame that requests their leave from the multicast group to the coordinator. FIG. 4G is a layout diagram illustrating the multicast group leave request command frame transmitted from the stations 1 and 2 to the coordinator. The multicast group leave request command frame includes a multicast group leave request field indicating the request for the leave from the multicast group. The coordinator transmits a multicast group leave response command frame to the stations 1 and 2 in response to the request of the stations 1 and 2. FIG. 4H is a layout diagram illustrating the multicast group leave response command frame transmitted from the coordinator to the stations 1 and 2. The multicast group leave response command frame includes an information field on the leave from the multicast group. The information field can include information on whether the leave from the multicast group is accepted, an ID of the multicast group from which the stations 1 and 2 leave, etc.

Figure 5:
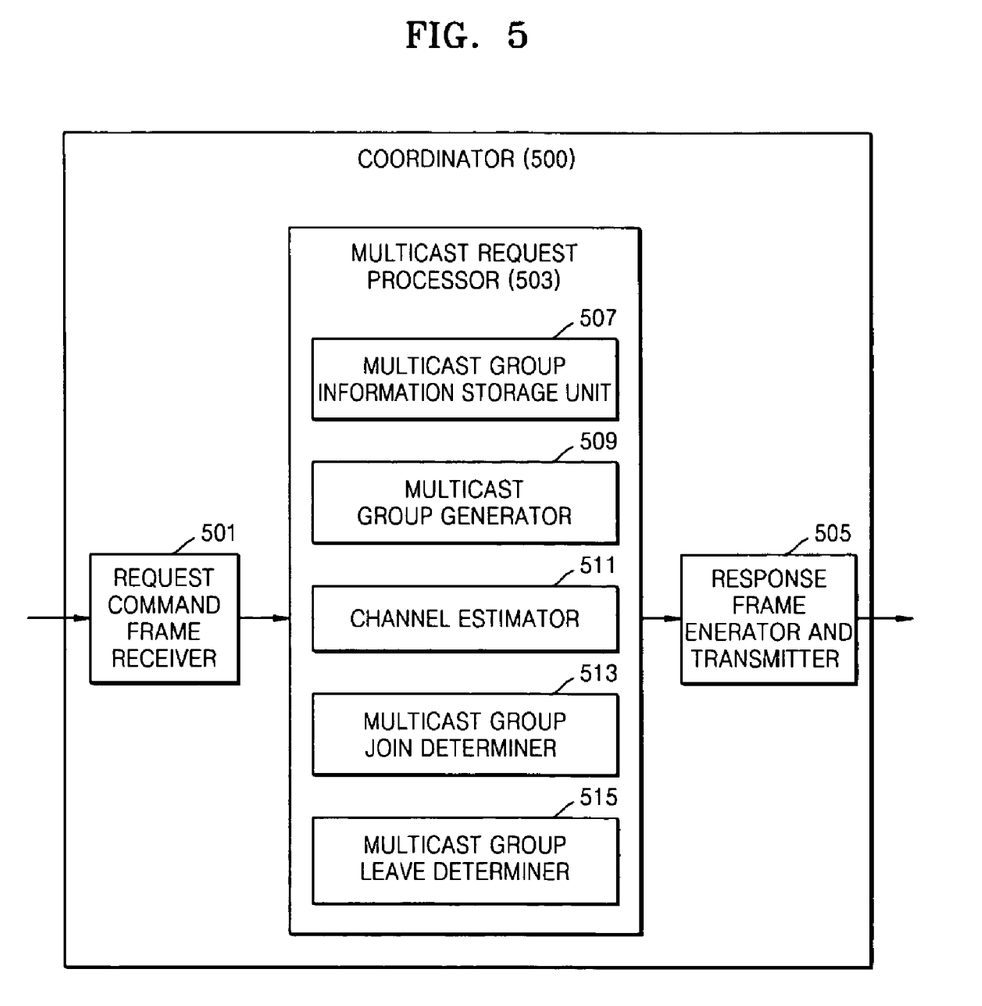
FIG. 5 is a block diagram illustrating a coordinator that forms a multicast group and communicates data according to an embodiment of the present general inventive concept.

FIG. 5 is a block diagram illustrating a coordinator 500 that forms a multicast group and communicates data according to an embodiment of the present general inventive concept. Referring to FIG. 5, the coordinator 500 includes a request command frame receiver 501 that receives a request command frame from stations, and a multicast request processor 503 that processes a multicast request based on the received request command frame and multicast group information, and a response frame generator and transmitter 505 that generates a response command frame to be transmitted to stations based on a result obtained from the multicast request processor and transmits the response command frame to stations. The multicast request processor 503 includes a multicast group information storage unit 507, a multicast group generator 509, a channel estimator 511, a multicast group join determiner 513, and a multicast group leave determiner 515. The request command frame received by the request frame receiver 501 is transmitted to the multicast request processor 503 to process a request according to content included in the request command frame.

When the request frame receiver 501 receives a multicast group information request command frame, the multicast request processor 503 reads information on a multicast group in a PLC cell from the multicast group information storage unit 507 that stores the multicast group information such as an ID or properties of the multicast group, and transmits the read information to the response frame generator and transmitter 505. The response frame generator and transmitter 505 inserts the received information to a multicast group information response command frame, generates a response command frame, and transmits the response command frame to the stations.

When the request frame receiver 501 receives a multicast group generation request command frame, the multicast group generator 509 generates a new multicast group. The response frame generator and transmitter 505 inserts information on the generated multicast group into a multicast group generation response command frame, generates a response command frame, and transmits the generated response command frame to the stations.

The request frame receiver 501 receives a multicast group join request command frame and the multicast group join determiner 513 determines whether to accept join a multicast join request of stations that request to join the multicast group. The response frame generator and transmitter 505, inserts information on whether stations are accepted to join the multicast group and a list of sub-channels used to transmit data from the joined stations into a multicast group join response command frame, generates a response command frame, and transmits the generated response command frame to the stations.

The coordinator 500 performs a channel estimation between stations of the PLC cell that request to join the multicast group and the coordinator 500 that receives the request for the join of the stations, and selects optimum sub-channels that transmit data to the multicast group according to a result of the channel estimation, before transmitting the multicast group join response command frame to the stations. The coordinator 500 selects a sub-channel from the optimum sub-channels to transmit the data to the multicast group within a channel range where all stations included in the multicast group can communicate.

When the request frame receiver 501 receives a multicast group leave request command frame, the multicast group leave determiner 515 determines whether to accept leave of stations that request to leave from the multicast group. The response frame generator and transmitter 505 inserts information on whether stations are accepted, in order to leave from the multicast group into a multicast group leave response command frame, generates a response command frame, and transmits the generated response command frame to the stations.

Figure 6:
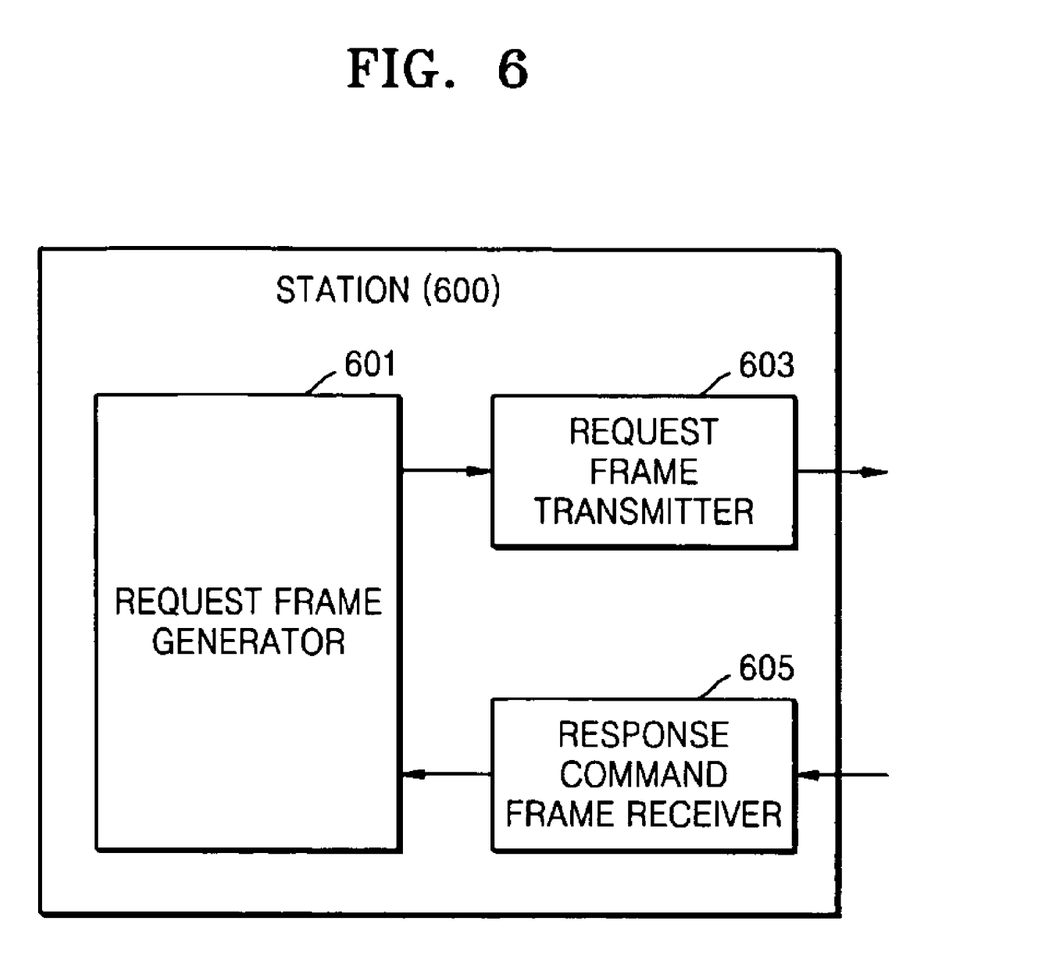
FIG. 6 is a block diagram illustrating a station that forms a multicast group and communicates data according to another embodiment of the present general inventive concept.

FIG. 6 is a block diagram illustrating a station 600 that forms a multicast group and communicates data according to an embodiment of the present general inventive concept. Referring to FIG. 6, the station 600 includes a request frame generator 601 that generates a request command frame transmitted to a coordinator, a request frame transmitter 603 that transmits the generated request command frame to the coordinator, and a response command frame receiver 605 that receives a response command frame from the coordinator. The response command frame received by the response frame receiver 605 is transmitted to the request frame generator 601. If another request is necessary according to the content included in the response command frame, a new request command frame is generated.

Referring to FIG. 6, a transmission station transmits data to a group including a plurality of reception stations that receive the same data, thereby preventing a channel bandwidth from being wasted, and preventing a station that does not desire to receive the data from receiving the data.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data transmission method of a coordinator device of a data transmission system, the method comprising:
   forming a group comprising a plurality of reception stations to receive same data;
   transmitting data from the coordinator device to the formed group;
   after forming the group, allowing at least one another reception station to join the group by a join request thereof;
   determining with the coordinator device whether the at least one another reception station joins the group when the coordinator device receives the join request from the at least one another reception station; and
   performing a channel estimation with the coordinator device between the at least one another reception station that requests to join the group and the coordinator device that receives the join request, and selecting optimum channels with the coordinator device to transmit data to the group according to a result of the channel estimation,
   wherein the channel estimation is an estimation of at least one of data traffic, a travelling time, and unavailability, and
   wherein the coordinator device receives a data frame including a field that requests information on all groups included in a power line communication (PLC) cell from at least one of the plurality of reception stations of the formed group.

2. The method of claim 1, wherein the selecting of the optimum channels comprises selecting a channel that transmits the data to the group from the optimum channels within a channel range where all reception stations included in the group can communicate.

3. The method of claim 1, wherein, before requesting to join the group, the at least one another reception station requests information on groups included in the power line communication (PLC) cell.

4. The method of claim 3, wherein the at least one another reception station determining whether to join the group based on the information on the groups, if there is no group to join, requesting the coordinator device to generate a new group, and, if there is an existing group to join, requesting the coordinator device to allow the at least one another station to join the group.

5. The method of claim 1, wherein the at least one another reception station requesting to leave from the group.

6. A non-transitory computer readable recording medium having embodied thereon a computer program, to execute a method comprising:
   forming a group comprising a plurality of reception stations to receive same data;
   transmitting data from a transmission station to the formed group;
   after forming the group, allowing at least one another reception station to join the group by a join request thereof;
   determining with a coordinator device whether the at least one another reception station joins the group when the coordinator device receives the join request from the at least one another reception station; and
   performing a channel estimation with the coordinator device between the at least one another reception station that requests to join the group and the coordinator that receives the join request, and selecting optimum channels with the coordinator device to transmit data to the group according to a result of the channel estimation,
   wherein the channel estimation is an estimation of at least one of data traffic, a travelling time, and unavailability, and
   wherein the coordinator device receives a data frame including a field that requests information on all groups included in a power line communication (PLC) cell from at least one of the plurality of reception stations of the formed group.

7. A coordinator device usable in a data transmission system, comprising:
   a processor to form a group comprising a plurality of reception stations that receive same data in response to a request frame from at least one station that requests to form the group comprising the plurality of reception stations that receive the same data, to generate a response frame in response to the request frame, to determine whether to allow at least one another station, if the at least one another station requests to join the group, to perform a channel estimation that includes an estimation of at least one of data traffic, a travelling time, and unavailability between the at least one another station that requests to join the group and the coordinator device that receives a join request, to select optimum channels that transmit data to the group according to a result of the channel estimation, and to receive a data frame including a field that requests information on all groups included in a power line communication (PLC) cell from at least one of the plurality of reception stations of the formed group; and
   a transmitter to transmit the response frame to the at least one station.

8. The coordinator device of claim 7, wherein a channel that transmits the data to the group is selected from the optimum channels within a channel range where all stations included in the group can communicate.

9. The coordinator device of claim 7, wherein the processor further comprises:
   a group information storage unit to store information on all groups included in the power line communication (PLC) cell.

10. A station device usable in a data transmission system, comprising:
   a frame generator processor to generate a data frame including a field that requests to form a group comprising a plurality of reception stations that receive the same data;
   a transmitter to transmit the data frame to a coordinator device; and
   a receiver to receive a response frame in response to the data frame from the coordinator device,
   wherein the frame generator processor generates another data frame including another field that requests information on all groups included in a power line communication (PLC) cell.

11. The station device of claim 10, wherein the frame generator processor generates another data frame including another field that requests to join the group.

12. The station device of claim 10, wherein the frame generator processor generates another data frame including another field that requests to leave the group.

13. A data transmission system, comprising:
   a station device having a frame generator processor to generate a data frame including a field to request to form a group including a plurality of reception stations that receive the same data;
   a coordinator device having a processor to form the group according to the data frame and to generate a response frame, so that the station device communicates with the group for data transmission upon receiving the response frame, to allow at least one other reception station to join the group by a join request thereof, to determine whether the at least one other reception station joins the group upon receiving the join request from the at least one other reception station, to perform a channel estimation that includes an estimation of at least one of data traffic, a travelling time, and unavailability between the at least one other reception station that requests to join the group and the coordinator device that receives the join request, to select optimum channels that transmit data to the group according to a result of the channel estimation, and to receive a second data frame including a second field that requests information on all groups included in a power line communication (PLC) cell from at least one of the plurality of reception stations of the formed group.

* * * * *